United States Patent
Maylotte et al.

(10) Patent No.: US 6,698,920 B1
(45) Date of Patent: Mar. 2, 2004

(54) TEMPERATURE MEASURING SYSTEM AND OPTICAL SWITCH USED THEREIN

(75) Inventors: Donald Herbert Maylotte, Schenectady, NY (US); Raymond Hemer Jones, Rotterdam, NY (US); James Peter DeLancey, Corinth, NY (US); Garland Mace Cross, Middleburgh, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/566,942

(22) Filed: May 8, 2000

(51) Int. Cl.[7] .............................. G01J 5/08; G01K 1/00; G02B 6/00; G02B 6/42; G01N 21/00
(52) U.S. Cl. ...................... 374/130; 374/141; 385/26; 356/73
(58) Field of Search ................. 374/130, 127, 374/141, 131, 144; 385/25, 26, 22; 359/139; 356/73

(56) References Cited

U.S. PATENT DOCUMENTS

| | | | |
|---|---|---|---|
| 4,118,985 A | | 10/1978 | Compton ..................... 73/346 |
| 4,142,417 A | * | 3/1979 | Cashdollar et al. ........ 73/355 R |
| 4,204,744 A | * | 5/1980 | Wittman ..................... 350/96.2 |
| 4,239,330 A | * | 12/1980 | Ashkin et al. ............. 350/96.18 |
| 4,326,798 A | * | 4/1982 | Kahn ........................... 356/45 |
| 4,378,144 A | * | 3/1983 | Duck et al. ............... 350/96.18 |
| 4,441,785 A | | 4/1984 | Petrozello |
| 4,568,183 A | | 2/1986 | Douglas |
| 4,648,711 A | | 3/1987 | Zachary |
| 4,657,386 A | * | 4/1987 | Suarez-Gonzalez et al. 374/127 |
| 4,666,297 A | | 5/1987 | Suarez-Gonzalez |
| 4,753,501 A | * | 6/1988 | Battle ......................... 350/96.2 |
| 4,790,669 A | * | 12/1988 | Christensen ................. 374/131 |
| 4,799,787 A | * | 1/1989 | Mason ......................... 356/43 |
| 4,896,935 A | * | 1/1990 | Lee ............................. 350/96.2 |
| 4,907,895 A | * | 3/1990 | Everest ....................... 374/130 |
| 4,942,294 A | | 7/1990 | Witte |
| 5,123,751 A | * | 6/1992 | Baker ......................... 374/143 |
| 5,292,196 A | * | 3/1994 | Iida et al. ................... 374/131 |
| 5,348,396 A | * | 9/1994 | O'Rourke et al. .......... 374/161 |
| 5,408,550 A | * | 4/1995 | Lefevre et al. ............. 385/18 |
| 5,507,576 A | * | 4/1996 | Fally .......................... 374/127 |
| 5,664,034 A | * | 9/1997 | Mock ........................... 385/16 |
| 5,755,510 A | | 5/1998 | Hernandez et al. |
| 6,031,947 A | * | 2/2000 | Laor ............................ 385/22 |
| 6,121,616 A | * | 9/2000 | Trigg .......................... 250/339.07 |
| 6,539,132 B2 | * | 3/2003 | Ivtsenkov et al. ............. 385/7 |

FOREIGN PATENT DOCUMENTS

| | | | | |
|---|---|---|---|---|
| EP | 379192 A2 | | 1/1990 | |
| JP | 03077030 A | * | 4/1991 | |
| SU | 0699352 | * | 11/1979 | ............ 374/130 |

\* cited by examiner

*Primary Examiner*—G. Verbitsky
(74) *Attorney, Agent, or Firm*—Penny A. Clarke; Patrick K. Patnode

(57) ABSTRACT

A system for measuring turbine bucket temperature in a gas turbine engine includes a plurality of optical detectors, such as a pyrometer and a spectrometer, and an optical switch for selectively directing radiation from turbine engine sight glass to any one of the optical detectors along a common line of sight. The optical switch preferably includes first and second blocks, with the optical detectors being disposed in the second block. A rotor is mounted between the first and second blocks for rotation about a rotational axis, and a fiber optic cable is provided having a first end located on the rotational axis and a second end offset from the rotational axis. Rotation of the rotor selectively positions the second end of the fiber optic cable adjacent to any one of the optical detectors.

35 Claims, 4 Drawing Sheets

TEMPERATURE MEASURING SYSTEM AND OPTICAL SWITCH USED THEREIN

BACKGROUND OF THE INVENTION

This invention relates generally to temperature measuring systems and more particularly to optical switches used in such systems.

A gas turbine engine includes a compressor that provides pressurized air to a combustion section where the pressurized air is mixed with fuel and burned for generating hot combustion gases. These gases flow downstream to a multistage turbine. Each turbine stage includes a plurality of circumferentially spaced apart blades or buckets extending radially outwardly from a wheel that is fastened to a shaft for rotation about the centerline axis of the engine. The hot gases expand against the turbine buckets causing the wheel to rotate. This in turn rotates the shaft that is connected to the compressor and may be also connected to load equipment such as an electric generator or a gearbox. Thus, the turbine extracts energy from the hot gases to drive the compressor and provide useful work such as generating electricity or propelling an aircraft in flight.

It is well known that the efficiency of gas turbine engines can be increased by raising the turbine operating temperature. As operating temperatures are increased, the thermal limits of certain engine components, such as the turbine buckets, may be exceeded, resulting in reduced service life or even material failure. In addition, the increased thermal expansion and contraction of these components adversely affects clearances and their interfitting relationship with other components. Thus, it is desirable to monitor the temperature of turbine buckets during engine operation to assure that they do not exceed their maximum rated temperature for an appreciable period of time.

A common approach to monitoring turbine bucket temperature is to measure the temperature of the gas leaving the turbine and to use this as an indication of the bucket temperature. The turbine exit temperature can be measured by locating one or more temperature sensors, such as thermocouples, in the exhaust stream. Because the bucket temperature is measured indirectly, it is relatively inaccurate. Thus, it does not permit optimum bucket temperatures to be utilized because a wide safety margin must be maintained.

The drawbacks of indirect bucket temperature measurement are well known, and approaches for measuring bucket temperatures directly have been proposed. One direct measurement approach uses a radiation pyrometer located outside of the engine casing and having a field of view focused on the turbine buckets through a sight glass formed in the casing wall. Radiation emitted by the heated turbine buckets thus impinges on the pyrometer that then generates an electrical signal representative of the bucket temperature. However, during engine operation the sight glass is exposed to high temperature exhaust gases that tend to cloud the sight glass and adversely affect the pyrometer reading. Furthermore, the optical emissivity of the bucket surfaces is usually unknown, which also introduces error into the temperature measurement.

Accordingly, it would be desirable to have an approach to monitoring turbine bucket temperature that remotely monitored bucket temperature through the available sight glass, while avoiding the problems of limited optical access, impaired sight glasses, and unknown surface characteristics.

BRIEF SUMMARY OF THE INVENTION

The above-mentioned need is met by the present invention, which provides a system for measuring bucket temperature that includes a plurality of optical detectors, such as a pyrometer and a spectrometer, and an optical switch for selectively directing radiation from turbine engine sight glass to any one of the optical detectors along a common line of sight.

In one preferred embodiment, the optical switch includes first and second blocks, with the optical detectors being disposed in the second block. A rotor is mounted between the first and second blocks for rotation about a rotational axis, and a fiber optic cable having a first end located on the rotational axis and a second end offset from the rotational axis is provided. Rotation of the rotor selectively positions the second end of the fiber optic cable adjacent to any one of the optical detectors.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
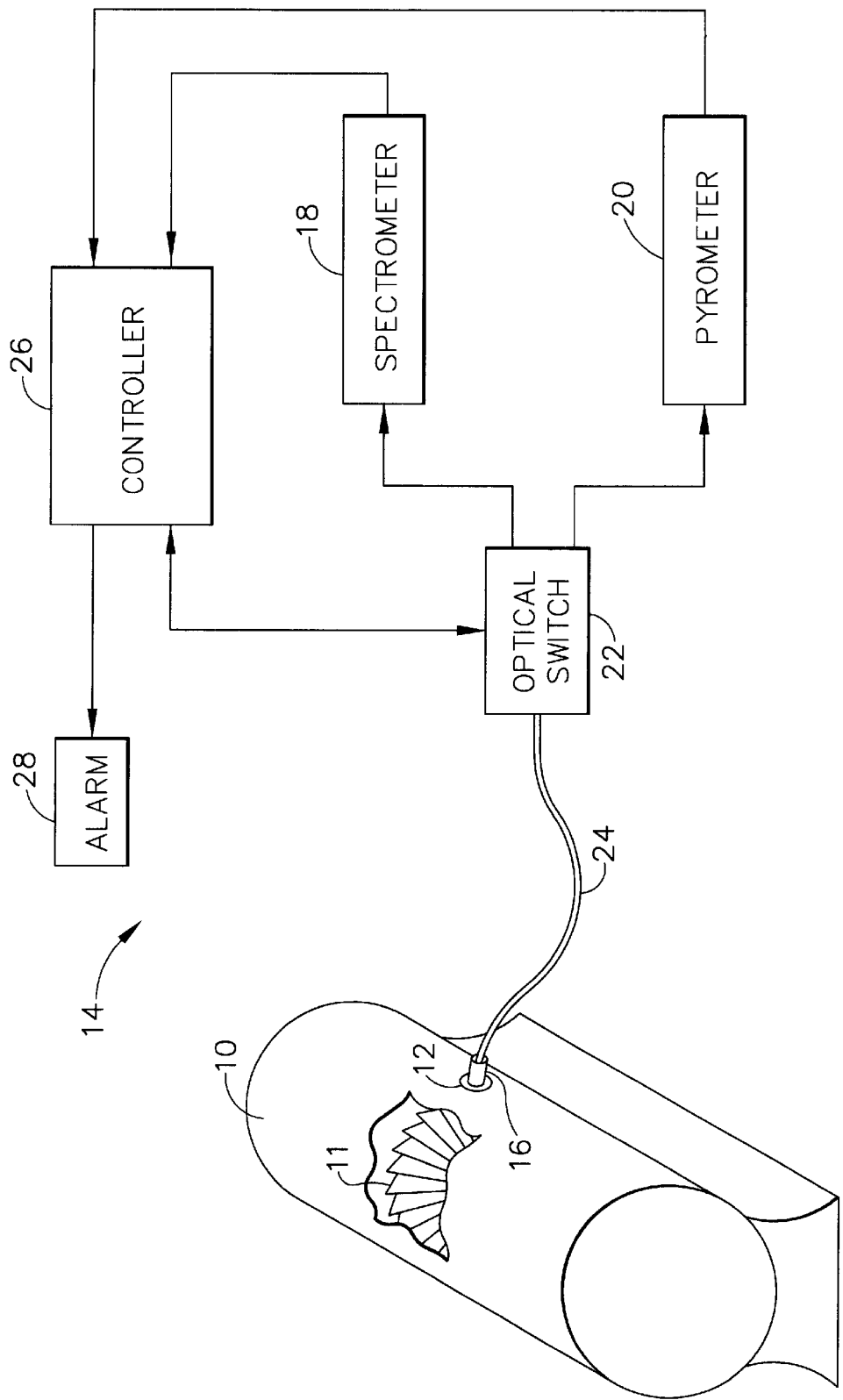
FIG. 1 is a schematic view of one embodiment of a temperature monitoring system having an optical switch.
Figure 2:
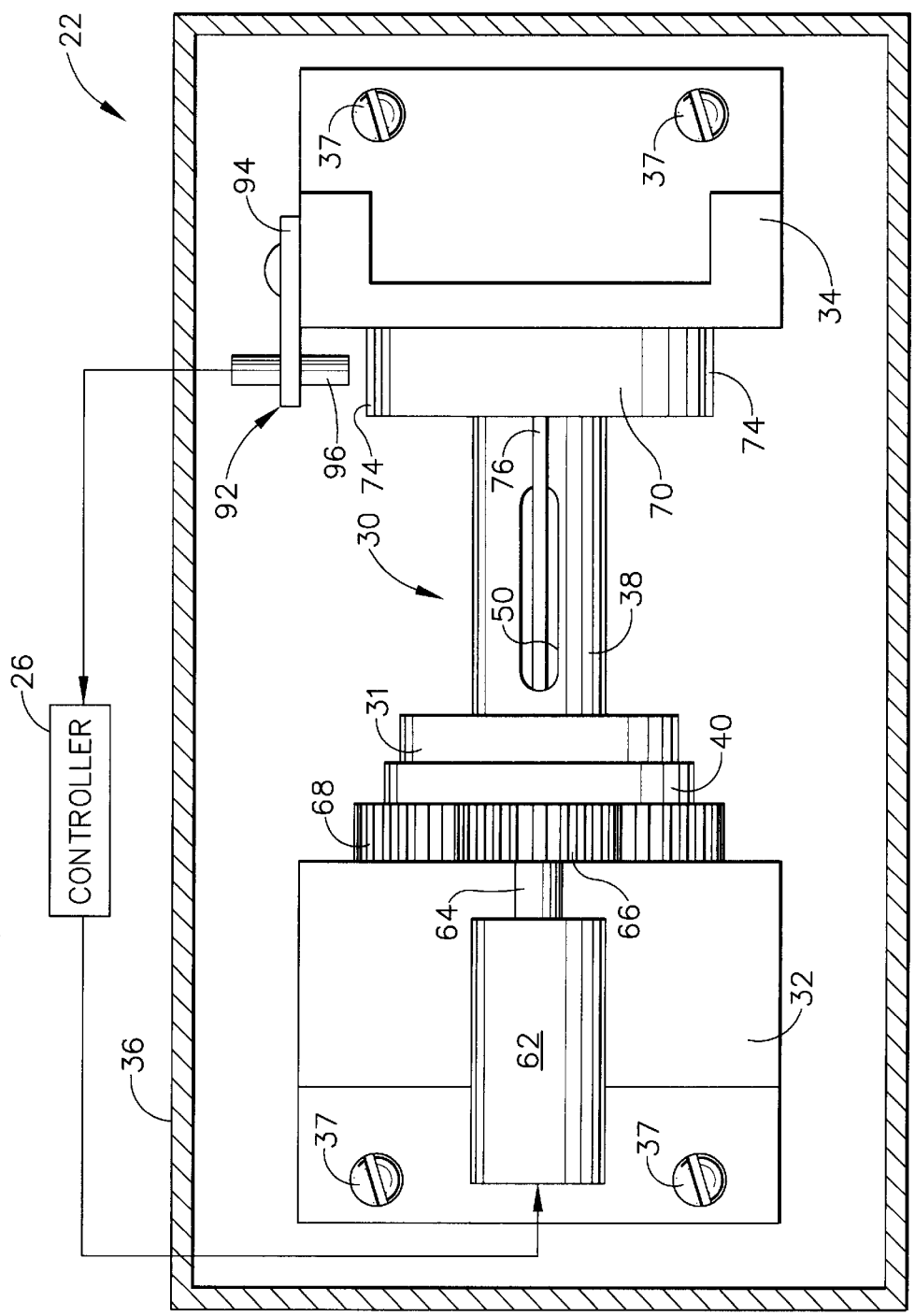
FIG. 2 is cross-sectional top view of the optical switch of FIG. 1.

Referring to the drawings wherein identical reference numerals denote the same elements throughout the various views, FIG. 1 schematically shows a gas turbine engine 10 having a plurality of turbine buckets 11 mounted internally for rotation about the engine's centerline axis. As is known in the art, the gas turbine engine 10 has a sight glass 12 formed in its outer casing wall for providing optical access to the interior thereof. An optical system 14 is provided for measuring and monitoring the temperature of the turbine buckets 11. The system 14 includes an optical head 16 mounted on the sight glass 12, a spectrometer 18, a pyrometer 20, and an optical switch 22 for selectively directing radiation transmitted through the sight glass 12 to either one of the spectrometer 18 or the pyrometer 20. The optical head 16 is a conventional element that focuses the line of sight of the optical switch 22 onto the turbine buckets 11. A fiber optic cable 24 is provided for transmitting radiation from the optical head 16 to the optical switch 22.

With this arrangement, the system 14 is able to deliver radiation from the turbine buckets 11 to both the spectrometer 18 and the pyrometer 20, along the same line of sight. The spectrometer 18 measures the intensities at the various wavelengths of the radiation impinging thereon and generates an electrical signal representative of the resultant waveform. The pyrometer 20 generates an electrical signal proportional to the intensity of the radiation falling on it. This signal is indicative of the temperature of the turbine buckets 11 because the intensity of radiant energy emitted from the buckets 11 is a function of their temperature. Both the spectrometer signal and the pyrometer signal are fed to a controller 26. The pyrometer signal is used for relative bucket temperatures, and the spectrometer signal is used for absolute bucket temperatures. By comparing the two signals, the controller 26 is able to accurately determine the bucket temperature even if the sight glass 12 becomes clouded due to exposure to high temperature gases in the engine 10, or if the bucket surfaces are gray bodies with unknown emissivity.

Thus, the system 14 is able to continuously monitor the temperature of the turbine buckets 11. If the bucket temperature exceeds a predetermined level, the controller 26 sends a signal that triggers an alarm 28 to alert the operator of the engine 10 of an impending problem. The controller 26 also controls the positioning of the optical switch 22 as it switches back and forth between the spectrometer 18 and the pyrometer 20. It should be noted that the controller 26 could be located on-site or remote from the gas turbine engine 10. For instance, the optical switch 22 could be remotely controlled from a desktop computer through a telephone line, network, or other transmission means. Although the system 14 has been described as employing the spectrometer 18 and the pyrometer 20, it should be noted that different types of detectors could also be used. Furthermore, more than two detectors can be used, as will become apparent from the following description of the optical switch 22.

Referring now to. FIGS. 2–5, the optical switch 22 is shown in more detail. The switch 22 includes a rotor assembly 30 rotatively mounted between first and second blocks 32 and 34 disposed within a closed housing 36. The housing 36 encloses all of the other components to prevent contamination thereof. The first and second blocks 32 and 34 are fixedly secured to the housing 36 via conventional fasteners 37. The first block 32 is located near the front of the housing 36, and the second block 34 is located near the rear of the housing 36. As used herein, the front or forward end of the optical switch 22 (or any element thereof) refers to the end of the switch 22 in which input from the optical head 16 is received via the fiber optic cable 24. The front of the optical switch 22 is shown on the left in FIGS. 2 and 3. Conversely, the rear of the optical switch 22 (or any element thereof) is shown on the right in FIGS. 2 and 3. As will been seen below, this is the end of the switch 22 at which optical detectors are provided to collect data that is output to the controller 26.

Figure 3:
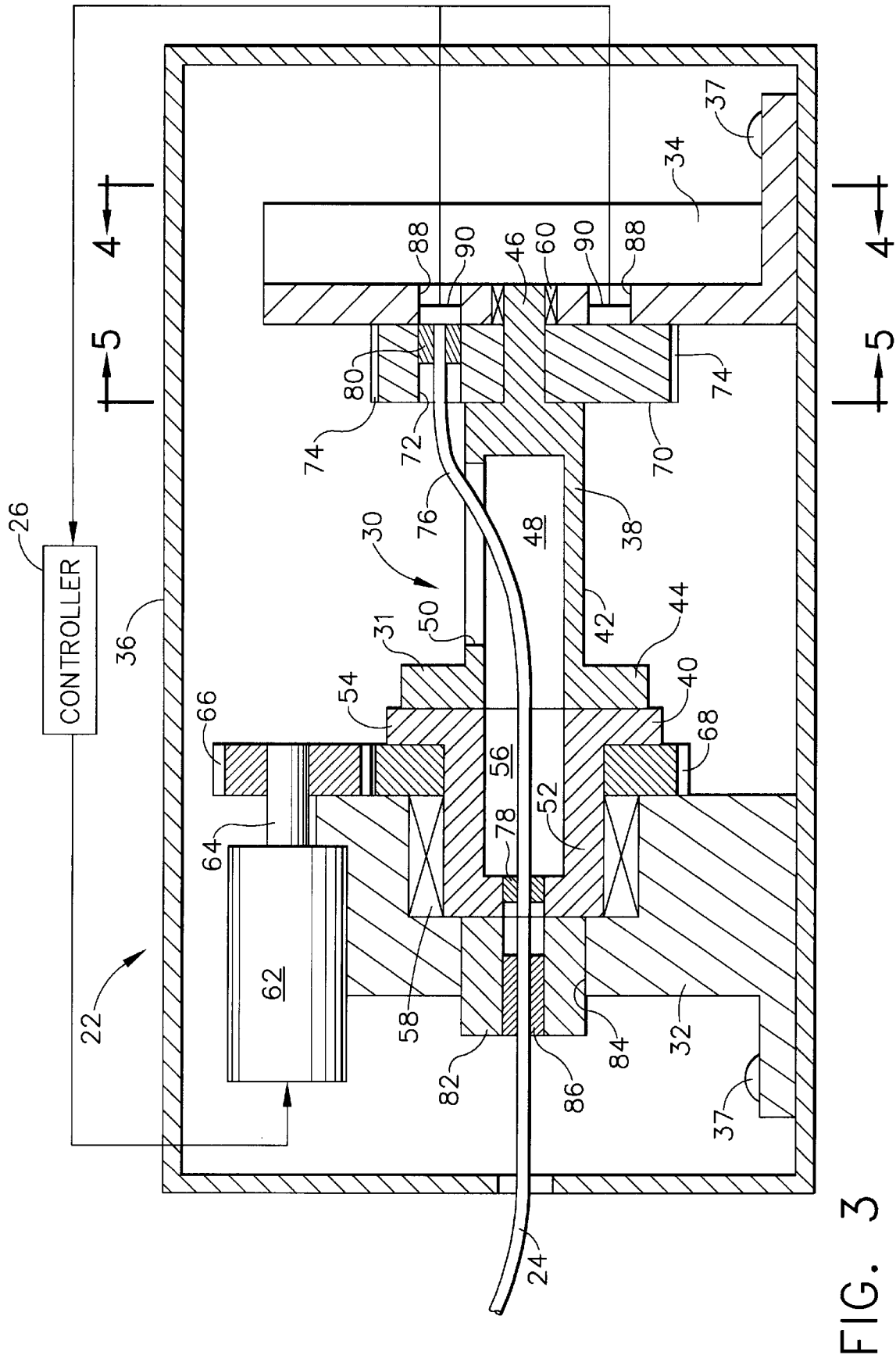
FIG. 3 is cross-sectional side view of the optical switch of FIG. 1.
Figure 5:
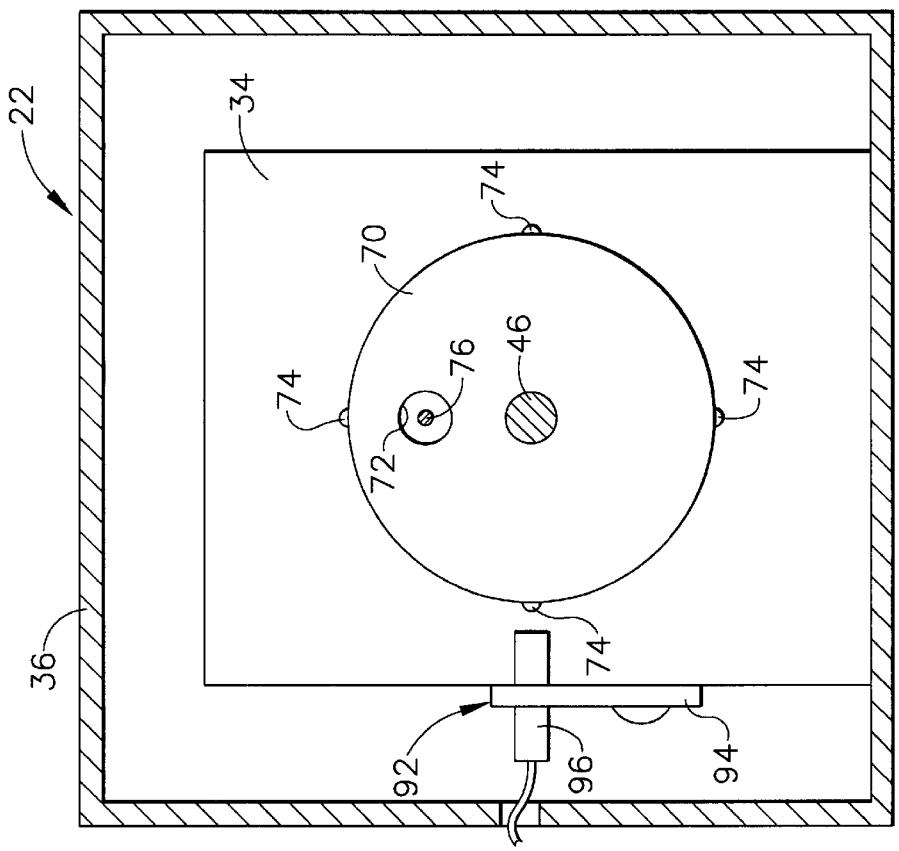
FIG. 5 is a cross-sectional view of the optical switch taken along line 5—5 of FIG. 3.

The rotor assembly 30 includes a rotor 31 that comprises a rotor shaft 38 and a forward hub 40 attached to the forward end of the rotor shaft 38. The rotor 31 could alternatively be of a single piece construction. The rotor shaft 38 comprises a substantially cylindrical section 42 having a mounting flange 44 formed on its forward end and a trunnion 46 formed on its rear end. The trunnion 46 extends outwardly along the longitudinal axis defined by the cylindrical section 42. A central axial bore 48 is formed in the forward end of the rotor shaft 38 and extends nearly the entire length thereof. A lengthwise extending slot 50 is formed in the cylindrical section 42 so as to provide access to the axial bore 48. The forward hub 40 has a substantially cylindrical section 52 and a mounting flange 54 formed on its rear end. The mounting flanges 44 and 54 are fixedly secured by conventional means so that the rotor shaft 38 and forward hub 40 (i.e., the rotor 31) will rotate in unison. The longitudinal axis defined by the cylindrical section 52 coincides with the longitudinal axis of the cylindrical section 42 to define a single rotational axis for the rotor assembly 30. The forward hub 40 includes a central axial bore 56 extending through the entire length thereof. As shown in FIG. 3, the axial bore 56 is counter-sunk so as to have a smaller diameter forward portion and a larger diameter rear portion.

The cylindrical section 52 of the forward hub 40 is rotatively received in a bearing 58 formed in the rear surface of the first block 32 so that the rotor assembly 30 can rotate with respect to the first and second blocks 32 and 34 about its rotational axis. Similarly, the trunnion 46 is rotatively received in a bearing 60 formed in the front surface of the second block 34. Rotation of the rotor assembly 30 is effectuated by a motor 62 mounted to the top of the first block 32. The motor 62, which is preferably, but not necessarily, a 12-volt DC gearbox motor, has a shaft 64 that can be selectively rotated in either a clockwise or counter-clockwise direction. A drive gear 66 is fixedly mounted on the shaft 64 and engages a rotor gear 68 that is fixedly mounted on the cylindrical portion 52 of the forward hub 40, between the rear surface of the first block 32 and the mounting flange 54. Thus, when the motor 62 rotates the drive gear 66, as dictated by input from the controller 26, the rotation is transmitted to the rotor assembly 30 via the rotor gear 68.

The rotor assembly 30 includes a positioning disk 70 fixedly mounted on the trunnion 46 of the rotor shaft 38 for rotation therewith, adjacent to the front surface of the second block 34. Specifically, the positioning disk 70 has a central bore in which the trunnion 46 is received so as to be mounted concentrically with respect to the rotor shaft 38. An offset hole 72 is formed in the positioning disk 70 at a distance from the center of the positioning disk 70. The positioning disk 70 also has four trip steps 74 equally spaced about its outer circumferential edge, the purpose of which is described below.

The rotor assembly 30 further includes a second fiber optic cable 76 having first end located in the forward end of the axial bore 56 of the forward hub 40. The second fiber optic cable 76 extends rearward through the axial bore 56, into the axial bore 48 of the rotor shaft 36, and through the shaft slot 50. The second end of the second fiber optic cable 76 is disposed in the offset hole 72 of the positioning disk 70. Thus, the first end of the second fiber optic cable 76 is located on the rotational axis of the rotor assembly 30, and the second end of the second fiber optic cable 76 is offset from the rotational axis. The first end of the second fiber optic cable 76 is retained by a grommet 78 snugly received in the smaller diameter forward portion of the bore 56. The second end of the second fiber optic cable 76 is retained in the offset hole 72 by a grommet 80 snugly received therein.

The first end of the second fiber optic cable 76 is aligned with, or even contacting, a corresponding end of the first fiber optic cable 24. It may also be equipped with optical devices, known in the art, to maximize the optical coupling between the second fiber optic cable 76 and the incoming fiber optic cable 24. The end of the first fiber optic cable 24 is fixed in the optical switch 22 by an adapter 82 disposed in a bore 84 formed in the forward surface of the first block 32. The adapter 82 is aligned with the bearing 58 so as to be aligned with the rotational axis of the rotor assembly 30. The end of the first fiber optic cable 24 is retained by a grommet 86 received in the adapter 82.

Figure 4:
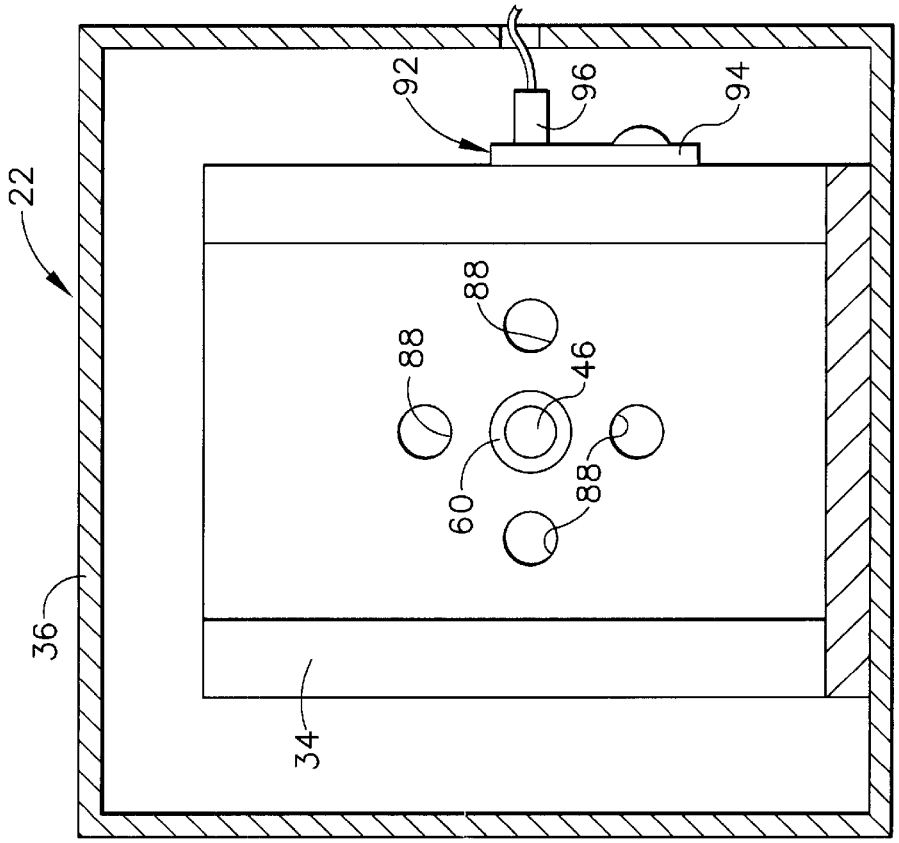
FIG. 4 is a cross-sectional view of the optical switch taken along line 4—4 of FIG. 3.

The second block 34 has four detector holes 88 formed therein for receiving various optical detectors 90. As best seen in FIG. 4, the four detector holes 88 are equally spaced 90 degrees apart with respect to the bearing 60 formed in the second block 34. The four holes 88 are all located the same radial distance from the rotational axis of the rotor assembly 30, which distance is equal to the radial distance that the offset hole 72 is located from the rotational axis. Thus, by rotating the rotor assembly 30, the offset hole 72 and the second end of the second fiber optic cable 76 can be positioned adjacent to any one of the four holes 88 and the optical detector 90 disposed therein. The output from each of the optical detectors 90 is fed to the controller 26 as shown in FIG. 3.

The optical detectors 90 could comprise the spectrometer 18 and the pyrometer 20 described above with respect to FIG. 1. However, although the system 14 of FIG. 1 is one preferred application of the optical switch 22, the switch 22 could be used in many other applications. Thus, the detectors 90 are not limited to the spectrometer 18 and the pyrometer 20 and other types of detectors could be utilized. Furthermore, the optical switch 22 is not limited to four detectors 90, as the second block 34 could be provided with fewer or more of the detector holes 88. In which case, the positioning disk 70 would preferably be provided with a corresponding lesser or greater number of trip steps 74.

A proximity sensor 92 is mounted on the second block 34 to provide position feedback to the controller 26 so that the second end of the second fiber optic cable 76 can be selectively positioned adjacent to the desired one of the detectors 90. In one preferred embodiment, best seen in FIG. 5, the proximity sensor 92 is a capacitance-type proximity sensor mounted to the second block 34 via a plate 94. An electrode 96 is attached to the plate 94 so as to have one end located very close to, but not contacting, the outer circumferential edge of the positioning disk 70. When one of the trip steps 74 passes the electrode 96 as the rotor assembly 30 rotates, the gap between the electrode 96 and the positioning disk 70 becomes very small. At this point, the electrode 96 and the positioning disk 70 function as the two plates of a capacitor and a signal is generated. This signal is fed to the controller 26 so that the rotor position is known. The trip steps 74 are situated about the circumference of the positioning disk 70 such that the offset hole 72 will be aligned with one of the detector holes 88 whenever one of the trip steps 74 passes the electrode 96. Thus, the proximity sensor 92 provides positioning feedback to the controller 26 that allows the controller 26 to index the rotor assembly 30 to position the second end of the second fiber optic cable 76 adjacent to the desired one of the detectors 90.

In operation, the second end of the second fiber optic cable 76 is positioned adjacent to a selected one of the optical detectors as determined by the control algorithm of the controller 26. Specifically, the controller 26 sends a signal to the motor 62, which causes the rotor assembly to rotate via the gears 66 and 68. When the appropriate trip step 74 moves into proximity with the electrode 96 of the proximity sensor 92, a signal is sent to the controller 26 that causes the controller 26 to stop rotation of the rotor assembly 30. With the rotor assembly in position, radiation from the optical head 16 is transmitted through the first fiber optic cable 24 to the first end of the second fiber optic cable 76. The radiation is then transmitted through the second fiber optic cable 76 and directed onto the selected one of the optical detectors 90. In response to the incident radiation, the selected optical detector sends an appropriate signal to the controller 26, as shown in FIG. 3.

When data from another one of the optical detectors 90 is required, the controller 26 sends another signal to the motor 62. In response to this signal, the motor 26 causes the rotor assembly 30 to rotate again and position the second end of the second fiber optic cable 76 adjacent to the other optical detector 90. Radiation from the optical head 16 will now be directed onto the other optical detector 90, and the detector will generate a corresponding signal that is fed to the controller 26. The operation is the same for any other of the optical detectors 90.

Thus, the optical switch 22 allows a plurality of optical detectors 90 to monitor a subject such as a turbine bucket 11 along the same line of sight. Using a common line of sight means that all of the optical detectors are looking at the same reference location on the buckets 11 and ensures that a valid comparison can be made between the outputs of the various detectors 90.

While specific embodiments of the present invention have been described, it will be apparent to those skilled in the art that various modifications thereto can be made without departing from the spirit and scope of the invention as defined in the appended claims.

What is claimed is:

1. A temperature measuring system comprising:
   at least two optical detectors, wherein said at least two optical detectors comprise a pyrometer and a spectrometer;
   means for selectively directing radiation to either one of said at least two optical detectors along a common line of sight; and
   a controller configured to receive and compare a spectrometer signal from said spectrometer and a pyrometer signal from said pyrometer to determine a temperature.

2. The temperature measuring system of claim 1, wherein said means for selectively directing radiation comprises an optical switch.

3. The temperature measuring system of claim 2 wherein said optical switch comprises:
   first and second blocks, said optical detectors being disposed in said second block;
   a rotor rotatively mounted between said first and second blocks about a rotational axis; and
   a fiber optic cable having a first end located on said rotational axis and a second end offset from said rotational axis, wherein rotation of said rotor selectively positions said second end of said fiber optic cable adjacent to any one of said optical detectors.

4. The temperature measuring system of claim 3 wherein each one of said optical detectors is located an equal distance from said rotational axis.

5. The temperature measuring system of claim 4 wherein said second end of said fiber optic cable is offset from said rotational axis an equal distance as said optical detectors.

6. The temperature measuring system of claim 3 further comprising a disk mounted on said rotor, wherein said second end of said fiber optic cable is located in a hole formed in said disk.

7. A temperature measuring system comprising:
   at least two optical detectors, wherein said at least two optical detectors comprise a pyrometer and a spectrometer; and
   an optical switch for selectively directing radiation to either one of said at least two optical detectors along a common line of sight, said optical switch comprising:
   first and second blocks, said optical detectors being disposed in said second block;
   a rotor rotatively mounted between said first and second blocks about a rotational axis; and
   a fiber optic cable having a first end located on said rotational axis and a second end offset from said rotational axis, wherein rotation of said rotor selectively positions said second end of said fiber optic cable adjacent to any one of said optical detectors, said temperature measuring system further comprising a disk mounted on said rotor, wherein said second end of said fiber optic cable is located in a hole formed in said disk, and wherein said first end of said fiber optic cable is located in a bore formed in one end of said rotor.

8. The temperature measuring system of claim 7 wherein said fiber optic cable extends through a slot formed in said rotor.

9. The temperature measuring system of claim 6 further comprising a proximity sensor located adjacent to said disk.

10. The temperature measuring system of claim 9 further comprising a plurality of trip steps formed on said disk.

11. The temperature measuring system of claim 3 further comprising a motor for rotating said rotor.

12. The temperature measuring system of claim 11 further comprising a first gear driven by said motor and a second gear mounted on said rotor, said first gear engaging said second gear.

13. The temperature measuring system of claim 3 further comprising a housing enclosing said first and second blocks and said rotor.

14. A system for measuring a bucket temperature in a gas turbine engine having a sight glass, said system comprising:
   a pyrometer;
   a spectrometer; and
   an optical switch for selectively directing radiation from said sight glass to either one of said pyrometer or said spectrometer along a common line of sight, said optical switch comprising:
      first and second blocks, said pyrometer and said spectrometer being disposed in said second block,
      a rotor rotatively mounted between said first and second blocks about a rotational axis, and
      a fiber optic cable having a first end located on said rotational axis and a second end offset from said rotational axis, wherein rotation of said rotor selectively positions said second end of said fiber optic cable adjacent to either one of said pyrometer or said spectrometer,
said system further comprising a disk mounted on said rotor, wherein said second end of said fiber optic cable is located in a hole formed in said disk, and wherein said first end of said fiber optic cable is located in a bore formed in one end of said rotor.

15. The system of claim 14 wherein said fiber optic cable extends through a slot formed in said rotor.

16. A system for measuring a bucket temperature in a gas turbine engine having a sight glass, said system comprising:
   a pyrometer;
   a spectrometer; and
   an optical switch for selectively directing radiation from said sight glass to either one of said pyrometer or said spectrometer along a common line of sight, said optical switch comprising:
      first and second blocks, said pyrometer and said spectrometer being disposed in said second block,
      a rotor rotatively mounted between said first and second blocks about a rotational axis, and
      a fiber optic cable having a first end located on said rotational axis and a second end offset form said rotational axis, wherein rotation of said rotor selectively positions said second end of said fiber optic cable adjacent to either one of said pyrometer or said spectrometer,
said system further comprising a disk mounted on said rotor and a proximity sensor located adjacent to said disk, wherein said second end of said fiber optic cable is located in a hole formed in said disk.

17. The system of claim 16 further comprising a plurality of trip steps formed on said disk.

18. An optical switch comprising:
   first and second blocks;
   a rotor rotatively mounted between said first and second blocks about a rotational axis;
   a plurality of optical detectors disposed in said second block;
   a fiber optic cable having a first end located on said rotational axis and a second end offset from said rotational axis, wherein rotation of said rotor selectively positions said second end of said fiber optic cable adjacent to one of said optical detectors; and
   a disk mounted on said rotor;
   wherein said second end of said fiber optic cable is located in a hole formed in said disk;
   wherein said first end of said fiber optic cable is located in a bore formed in one end of said rotor.

19. The optical switch of claim 18 wherein said fiber optic cable extends through a slot formed in said rotor.

20. The optical switch of claim 18 further comprising a proximity sensor located adjacent to said disk.

21. The optical switch of claim 20 further comprising a plurality of trip steps formed on said disk.

22. The optical switch of claim 18 further comprising a motor for rotating said rotor.

23. The optical switch of claim 22 further comprising a first gear driven by said motor and a second gear mounted on said rotor, said first gear engaging said second gear.

24. The optical switch of claim 18 further comprising a housing enclosing said first and second blocks and said rotor.

25. The optical switch of claim 18 wherein each one of said optical detectors is located an equal distance from said rotational axis.

26. The optical switch of claim 25 wherein said second end of said fiber optic cable is offset from said rotational axis an equal distance as said optical detectors.

27. A system for measuring a bucket temperature in a gas turbine engine having a sight glass, said system comprising:
   a pyrometer;
   a spectrometer;
   an optical switch for selectively directing radiation from said sight glass to either one of said pyrometer or said spectrometer along a common line of sight; and
   a controller configured to receive and compare a spectrometer signal from said spectrometer and a pyrometer signal from said pyrometer to determine the bucket temperature.

28. The system of claim 27 further comprising a fiber optic cable extending between said sight glass and said optical switch.

29. The system of claim 27 wherein said optical switch comprises:
   first and second blocks, said pyrometer and said spectrometer being disposed in said second block;
   a rotor rotatively mounted between said first and second blocks about a rotational axis; and
   a fiber optic cable having a first end located on said rotational axis and a second end offset from said rotational axis, wherein rotation of said rotor selectively positions said second end of said fiber optic cable adjacent to either one of said pyrometer or said spectrometer.

30. The system of claim 29 wherein said pyrometer and said spectrometer are located equal distances from said rotational axis.

31. The system of claim 30 wherein said second end of said fiber optic cable is offset from said rotational axis an equal distance as said pyrometer and said spectrometer.

32. The system of claim 29 further comprising a disk mounted on said rotor, wherein said second end of said fiber optic cable is located in a hole formed in said disk.

33. The system of claim 29 further comprising a motor for rotating said rotor.

34. The system of claim 33 further comprising a first gear driven by said motor and a second gear mounted on said rotor, said first gear engaging said second gear.

35. The system of claim 29 further comprising a housing enclosing said first and second blocks and said rotor.

\* \* \* \* \*